Patented Feb. 13, 1951

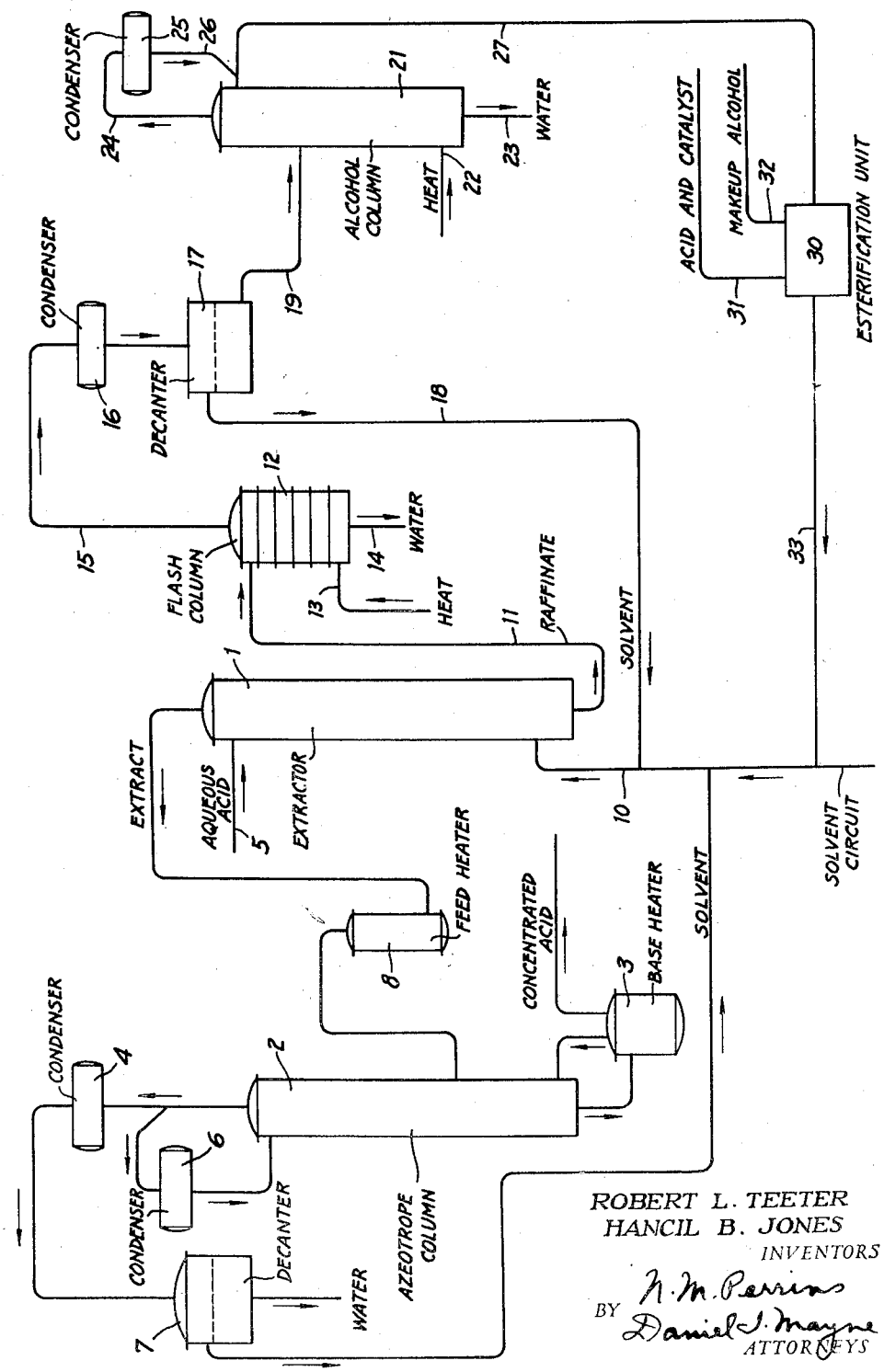

2,541,486

UNITED STATES PATENT OFFICE 2,541,486

ACID CONCENTRATION

Robert L. Teeter and Hancil B. Jones, Kingsport, Tenn., assignors to Eastman Kodak Company, Rochester, N. Y., a corporation of New Jersey Application September 17, 1948, Serial No. 49,814

4 Claims. (Cl. 260—541)

This invention relates to processes of removing water from aqueous aliphatic acids and the like liquids. More particularly this invention concerns improvements in such type processes wherein an ester type of entrainer of controlled composition is utilized for facilitating the water removal.

The removal of water from aqueous aliphatic acids by means of an ester type entrainer is the subject of a number of prior patents by our co-workers such as, for example, U. S. Patents 2,049,440; 2,049,441; 2,129,684; and 2,171,549. As pointed out in these patents, there are industrial processes from which there is obtained large quantities of aqueous aliphatic acid solutions. An illustration of such type solution would be a liquid containing 25% to 35% acetic acid, the balance substantially all water. As fully pointed out by our co-workers in their patents, aforementioned, the water may be removed from such aqueous solutions in an efficient and economical manner by the use of ester-alcohol types of entrainers. However, in processes of the class indicated for removing water operated on commercial sources of aqueous liquids there may be variations in the water content of the liquid being processed and other variations all of which have an effect on the composition of the aforementioned ester type of entrainer.

As appreciated by our co-workers, aforesaid, the composition of entrainer may tend to change somewhat in its use during the acid concentration process and methods have been described in the patents aforementioned for controlling the entrainer composition. Briefly some of these methods proposed have involved the return of a portion of the entrainer to a lower part of the distillation column, or the processing of decanted entrainer in, for example, an esterification unit, and the like procedure for obtaining and maintaining the entrainer of a predetermined composition.

We have found in dehydration processes of the class described utilizing an ester type entrainer new procedure which is believed to be a considerable improvement for controlling the entrainer composition, as will be set forth in detail hereinafter. In the description which follows it will be kept in mind that the present invention contemplates the same general type of process for the removal of water from aqueous liquids and the utilization of the same general class of ester entrainers (excepting that in accordance with the present invention the ester content may be higher) as fully described by our co-workers in their prior patents. Therefore, in the present description only brief mention will be made of the azeotropic distillation aspects, equipment details, and the like since further information on such matters, if desired, may be readily obtained by reference to the aforesaid patents.

This invention has for one object to provide improvements in processes for removing water from aqueous liquids by procedure utilizing an ester type entrainer. A particular object is to provide a better and more economical procedure for controlling the entrainer composition in process as aforementioned. Another object is to provide a method for entrainer control which may be applied to only a small portion of the liquids in the system, but still give satisfactory control for the entire entrainer in the system. Still another object is to provide an apparatus arrangement particularly suited for carrying out the present process of entrainer control. Other objects will appear hereinafter.

For a more complete understanding of the invention reference will be made to the attached drawing forming a part of the present application. The attached drawing is a semidiagrammatic side elevation view, somewhat in the nature of a flow sheet showing an embodiment of an apparatus arrangement such as may be used for carrying out the processes of the present invention for controlling the entrainer composition. This drawing will be described and discussed in detail later on in the present specification.

As already mentioned above it has been appreciated that in utilizing ester-alcohol types of entrainer in the commercial processing of aqueous liquids that the composition of the entrainer may tend to change. For example, when the entrainer is in contact with relatively dilute aqueous acids some of the ester may be hydrolyzed, thereby causing an increase in the alcohol content of the entrainer. One way of restoring the entrainer to its initial ratio, as described in the patents aforesaid, is to subject the decanted entrainer to, for example, esterification for increasing the ester content. Such a procedure while effective in regaining the desired ester content does not involve the handling of a large volume of liquid.

In accordance with the general aspects of our invention we have discovered in processes of the class indicated that rather than look to the entrainer or solvent phase of the process for control that the unusual aspect arises that the water or raffinate phase may be looked to for entrainer control. As will be apparent from the detailed description which follows, this manner of control is very advantageous in that it involves the handling of only about ⅛ to 1/10 of the materials required to be handled by the prior method, above mentioned. We have further found that our new procedure is sufficiently flexible to be operated over the entire range of reasonably useful entrainer compositions. That is, for example, if the alcohol content of the ester entrainer should materially increase this change is more or less automatically reflected in the character of the raffinate phase and by the procedure of the present invention increased compensation for this change is instituted in our process for returning the entrainer composition to its initial predetermined ester-alcohol ratio.

It is desired to mention at this point that the method of entrainer control of the present invention has special application to the type of process of removing water from relatively dilute solutions of aliphatic acids. In such type processes where the content of water with respect to the acid is on the high side, due to hydrolysis of the ester entrainer the change of entrainer composition is toward an increased alcohol content. The process of the present invention is particularly effective in this type situation for restoring the ester-entrainer to the desired composition.

In the broader aspects, the present invention comprises subjecting the raffinate from an extraction-distillation system, utilizing an ester entrainer of the class indicated, to a series of distillations wherein the decanted solvent layer from the first distillation may be returned to the system and the distillate from the second distillation increased in ester content and returned to the system. It has been found that the combined effect of the foregoing distillations renders the entrainer composition reasonably uniform and of the desired ratio.

A further understanding of the invention will be had by now referring to the attached drawing. In this drawing an extractor is shown at 1. This extractor may be of either conventional or special construction it making no difference for the purposes of the present invention. That is, the extractor may be comprised of several units such as shown in Patent 2,129,684, or may be a simple single column extractor. The extractor 1 is connected to the azeotropic distillation system 2 as shown to the left thereof. This system is more or less conventional in that it includes in addition to the distillation column 2, having a base heater 3, the usual condensers and decanters 4, 6, and 7. For example, condenser 6 is for the purpose of providing reflux. A feed heater and the like units are provided at 8.

Reference is now made to the various parts to the right of the extractor 1 on the drawing and with which the present invention is primarily concerned. The extractor 1 is connected by conduit 11 with flash column 12. This column is of more or less conventional construction and is provided with means 13 for introducing a source of heat such as steam. A draw-off conduit for water is provided at 14. The vapors evolved from the top of the flash column through the off-take conduit 15 lead through condenser 16 to decanter or separator 17. The construction of 17 may be in accordance with Patent 2,146,721.

Decanter 17 is provided with conduit 18 for returning separated solvent to the extraction cycle and conduit 19 for conducting the water layer (which contains alcohol) to the distillation unit 21 wherein the alcohol content may be further isolated for the control purposes of the present invention. This distillation column 21 may be of a conventional bubble cap construction provided with means 22 such as coils or open steam for supplying heat and a withdrawal conduit 23 for removing water. The upper part of the column is provided with a vapor take-off conduit 24 which leads to condenser 25 from which the condensate may be divided through either conduit 26 or 27. That is, a portion of the condensate of more concentrated alcohol may be returned as reflux through conduit 26 and the other portion conducted through 27 to unit 30 which is the over-all designation for an esterification unit.

The esterification unit may be comprised of any suitable reactor for carrying out esterification such as a small still or the like. Provision is made by means of conduits 31 and 32 for adding acid and catalyst such as sulfuric acid or the various other esterification catalysts as well as additional ingredients such as further alcohol for making more ester in the event it is desired to increase the total ester content in the process. By constantly supplying a small amount of make-up at this point the aggregate entrainer in the entire system may be kept up to the maximum for best operation. The ester entrainer thus obtained is returned through conduit 33 to the extraction cycle.

The function of the apparatus arrangement just described as well as a further understanding of the inventive details of the present process will be had by a consideration of the following example illustrating the preferred embodiment of the present invention.

In this example the specific ester type entrainer described is propyl acetate-propyl alcohol either the normal or iso forms. The specific aqueous aliphatic acid described comprises about 30 percent acetic acid in approximately 70% of water. Such an entrainer per se is already described in the patents, aforementioned, such as 2,129,684 together with various other ester-alcohol entrainers such as butyl acetate-butyl alcohol and the like. Hence, it is to be understood that the reference here to propyl acetate-propyl alcohol is merely illustrative of the handling of one ester type entrainer to control its composition and similar procedure may be used for handling the various other ester entrainers of the class already referred to.

In accordance with this example, the aqueous acetic acid solution was fed into extractor 1 through conduit 5. The system had previously been charged with several thousand pounds of the propyl acetate-propyl alcohol entrainer of a predetermined composition entering extractor 1 through conduit 10. This entrainer as charged had an ester content of, for example, about 96% on the average or an ester-alcohol ratio of greater than 30:1.

The ester in passing through extractor 1 contacts the aqueous acid in the usual manner for extraction and the extract withdrawn from the top of extractor 1 and conducted to feed heater 8, comprises about 66% of propyl acetate, 1½% propyl alcohol, approximately 11% water, and 20% of the acetic acid. It will be observed that the initial water content of 70% water to 30% acid has thereby been reduced to approximately 11% water to 20% acid.

This extract fed into feed heater 8 is then processed in the azeotropic column 2 and associated parts 3, 4, 6, and 7 in the manner such as already described in Patents 2,049,440; 2,049,441; and 2,129,684. Hence, detailed description of these operations are unnecessary. It is sufficient to state that substantially anhydrous acid is withdrawn from the base heater 3 and that decanted ester entrainer is withdrawn at 7 for returning to the extraction cycle.

It has been found that the ester entrainer in this part of the cycle, while perhaps depleted slightly in total ester content, is not materially changed in ester-alcohol ratio, although considering the total several thousand pounds of ester entrainer in the entire system that the ester-alcohol ratio of the total has changed.

Therefore, in accordance with the present invention rather than process the large quantity of decanted ester from 7 to increase the ester content and rebalance the over-all ester-alcohol ratio we have discovered that the same objective may be more readily accomplished by processing the liquid in another part of the system where not only are smaller quantities for handling involved but losses of entrainer from the system are checked.

Therefore, considering in detail the special aspects of the present invention reference is made to the raffinate liquid in conduit 11. This raffinate in the particular example under description contains about 96% water, 2½% propyl acetate, and 1% propyl alcohol. It will be noted that the ester-alcohol ratio in this regard is around 2½ to 1 as compared with the initially charged entrainer wherein the ester-alcohol ratio was, for example, greater than 30 to 1. Hence, it will be noted that the change in the entrainer which occurs seems to be reflected in that portion of the entrainer entering the aqueous phase.

This raffinate is supplied to flash column 12 where in a single distillation a large part of the water is eliminated and may be discarded through conduit 14. The vapors evolved through 15 and condensed in 16 are decanted in 17 to a solvent layer and a water layer. The solvent layer withdrawn through conduit 18 is of a character, namely containing sufficiently high ester ratio that it may be returned through conduit 18 to the extraction cycle. The other layer withdrawn from decanter 17 through conduit 19 is comprised of approximately 12% alcohol and 3½% of the propyl acetate, the balance being water. This liquid is distilled in column 21 in a conventional manner by the injection of live steam into the column through conduit 22 to volatilize vapors through conduit 24 which comprise about 60% propyl alcohol and 20% propyl acetate, the balance being water. It will be observed, therefore, that the propyl alcohol content in the process has been segregated and concentrated from about 2 to 4% in the initially charged entrainer to about 14% in the solvent leaving flash column 12 to about 77% alcohol (on a water-free basis) in the liquid leaving decanter 17 through conduit 19 to column 21.

Therefore, in the present process the initial ester-alcohol ratio of the entrainer has been maintained in the bulk of the entrainer by segregating and concentrating liberated alcohol in another part of the process. This is possible because of our discovery that the process more or less regulates itself automatically for increases or decreases in the alcohol ratio of the entrainer. If higher alcohol appears in the entrainer greater quantities thereof are automatically carried out by the water layer going to the series of steps of our process as we have described above in detail.

The alcohol component thus isolated or segregated at 24 is condensed in condenser 25. A part of the condensate is returned in a conventional manner through conduit 26 for reflux and the remainder withdrawn through 27 to esterification unit 30.

In esterification unit 30 a part or all of the alcohol may be converted to ester by known esterification methods and if desired make-up materials added through 32 to increase the total quantity of ester discharged through conduit 33. The esterification 30 may be conveniently accomplished by supplying glacial acetic acid through conduit 31 together with a small amount of sulfuric acid or sulfonic catalysts which upon heating reacts with the propyl alcohol in 30 to convert the alcohol to propyl acetate.

In the example under description substantially all of the propyl alcohol received through conduit 27 was converted to propyl acetate and returned to the extraction cycle through conduit 33. In this manner the over-all entrainer composition was maintained at at least 96% propyl acetate, namely the same ratio as in the initially charged entrainer.

From the description just set forth it is apparent that should a different ester-alcohol ratio be desired in the entrainer, such as for example an entrainer with only about 92% ester, it would not be necessary to completely esterify all the alcohol coming to unit 30 but a mixture of ester-alcohol would be returned through conduit 33. It can be seen, therefore, that the process of the present invention permits controlling the ester-alcohol ratio in the entrainer very closely and to practically any ratio that may be desired for the particular aliphatic acid solution being concentrated.

We prefer when processing relatively dilute aqueous aliphatic acids, such as containing two or three times as much water as acids, to maintain the ester content of the entrainer, say for example in excess of 95 or 96% as described in the above example. We have found that by so doing the over-all steam consumption in the process including the steam supplied in conduits 13 and 22 for operating the units of the present invention is less than in other ways of operation.

In the event it is desired to operate the present invention utilizing some other entrainer, such as for example butyl acetate-butyl alcohol, the procedure would be along the same lines as described above excepting that slightly higher temperatures would be required because of the higher boiling point of the butyl entrainer. The various boiling points and the like data are already set forth in the patents which have been mentioned, such as 2,129,684. Hence, description of such details herein does not appear to be necessary.

The materials of construction for the various apparatus parts may be of stainless steel or in some instances copper, as mentioned in the patents referred to. While we have referred to supplying heat by means of live steam this, of course, does not preclude using heating coils. Likewise, various other changes may be made.

It is thought it may be seen by those skilled in the art from the above description that our process is advantageous in that it provides a simple way of controlling an entrainer composition to a predetermined ratio. Our method requires the over-all handling of a much smaller quantity of liquid in order to obtain this control. That is, after the elimination of the water in unit 12 we handle only one-sixth to one-tenth of the amount of material handled in the prior art processes. This, of course, means smaller investment in equipment and associated items all of which contribute to the economy of our process. Other advantages will be apparent.

We claim:

1. A process for removing water from aqueous liquids containing an aliphatic acid which comprises contacting the aqueous aliphatic acid liquid with an ester-alcohol solvent having a predetermined ratio of ester to alcohol which ratio may change during the process, obtaining an extract from said contacting which comprises solvent, acid, and some water, subjecting said extract to a distillation treatment for separating the solvent and yielding a concentrated acid and separated solvent, returning the separated solvent without esterification to the process for forming further extract, also obtaining from said contacting a raffinate comprised principally of water but containing some ester and alcohol, subjecting said raffinate to a distillation treatment wherein a substantial portion of the water is eliminated and a distillate containing the ester and alcohol is obtained, condensing and decanting the distillate to obtain a layer having a substantial part of the ester content and another layer having a substantial part of the alcohol content, returning the ester layer to the process, further distilling the layer containing alcohol for concentrating the alcohol content, subjecting the resultant more concentrated alcohol to an esterification treatment for converting the alcohol to ester, this esterification being of a degree to obtain sufficient ester to give the desired ester-alcohol ratio, and supplying the ester thus produced to the returned solvent above mentioned for forming further extract.

2. A process for removing water from aqueous liquids containing a lower aliphatic acid which comprises contacting the aqueous aliphatic acid liquid with an ester-alcohol solvent having a predetermined ratio of ester to alcohol which ratio changes during use in the process, obtaining an extract from said contacting which comprises solvent, acid, and some water, subjecting said extract to a distillation treatment for separating the solvent and yielding a concentrated acid, returning the separated solvent without esterification to form further extract, also obtaining from said contacting a raffinate comprised principally of water but containing some ester and alcohol, subjecting said raffinate to a distillation treatment wherein a substantial portion of the water is eliminated and a distillate containing ester and alcohol is obtained, condensing and decanting the distillate to obtain a layer having a substantial part of the ester content and another layer having a substantial part of the alcohol content, returning the ester layer to the process, further treating the layer containing alcohol for further concentrating the alcohol content, subjecting the resultant more concentrated alcohol to an esterification treatment for converting it to ester, and returning this ester to the process whereby said entrainer ratio is controlled.

3. A process for removing water from aqueous liquids containing acetic acid which comprises contacting the aqueous acetic acid with an ester-alcohol solvent having a predetermined ratio of ester to alcohol which ratio changes during the process, obtaining an extract from said contacting which comprises solvent acetic acid and some water, subjecting said extract to distillation treatment for separating the solvent and yielding a concentrated acetic acid, returning the separated solvent without esterification to the process for forming further extract, also obtaining from said contacting a raffinate comprised principally of water but containing some ester and alcohol, subjecting said raffinate to a distillation treatment wherein a substantial portion of the water is eliminated and a distillate containing ester and alcohol is obtained, condensing and decanting the distillate to obtain a layer having a substantial part of the ester content and another layer having a substantial part of the alcohol content, returning the ester layer to the process, further distilling the layer containing alcohol for further concentrating the alcohol content, subjecting the resultant more concentrated alcohol to an esterification treatment and for converting at least a part of the alcohol and returning at least a part of the ester thus produced to form further extract, whereby the predetermined ratio is maintained.

4. A process for removing water from aqueous acetic acid comprised of about 25-35% acid and the balance water which comprises contacting the aqueous acetic acid liquid with an ester type solvent having a predetermined ratio of ester to any other component in the solvent which ratio may tend to change during the process, obtaining an extract from said contacting which comprises solvent acetic acid and some water, subjecting said extract to distillation treatment for separating the solvent and yielding a concentrated acid, returning the separated solvent without esterification to the process for forming further extract, also obtaining from said contacting a raffinate comprised principally of water but containing some ester and alcohol, subjecting said raffinate to a distillation treatment wherein a substantial portion of the water is eliminated and a distillate containing ester and alcohol is obtained, separating the distillate into a layer having a substantial part of the ester content and another layer having a substantial part of the alcohol content, returning the ester layer to the process, further treating the layer containing alcohol for further concentrating the alcohol content, subjecting the resultant more concentrated alcohol to an esterification treatment for converting it to ester and returning at least a part of this ester to the process.

ROBERT L. TEETER.
HANCIL B. JONES.

REFERENCES CITED

The following references are of record in the file of this patent:

UNITED STATES PATENTS

| Number | Name | Date |
|---|---|---|
| 1,425,624 | Bockhaus | Aug. 15, 1922 |
| 2,049,440 | Gordon | Aug. 4, 1936 |
| 2,129,684 | Gordon et al. | Aug. 4, 1936 |
| 2,430,086 | Staff | Nov. 4, 1947 |